(12) United States Patent
Schneiderman et al.

(10) Patent No.: US 12,479,931 B2
(45) Date of Patent: *Nov. 25, 2025

(54) POROUS POLYMERIC CELLULOSE PREPARED VIA CELLULOSE CROSSLINKING

(71) Applicant: NANOPAREIL, LLC, Comberton (GB)

(72) Inventors: Steven Schneiderman, Rapid City, SD (US); Todd J. Menkhaus, Rapid City, SD (US); Yong Zhao, Middleton, DE (US); Hao Fong, Rapid City, SD (US); Craig Arnold, Sioux Falls, SD (US)

(73) Assignee: NANOPAREIL, LLC, Comberton (GB)

( * ) Notice: Subject to any disclaimer, the term of this patent is extended or adjusted under 35 U.S.C. 154(b) by 2 days.

This patent is subject to a terminal disclaimer.

(21) Appl. No.: 18/158,301

(22) Filed: Jan. 23, 2023

(65) Prior Publication Data

US 2023/0383013 A1    Nov. 30, 2023

Related U.S. Application Data

(63) Continuation of application No. 17/248,915, filed on Feb. 12, 2021, now Pat. No. 11,560,438, which is a continuation of application No. 16/173,563, filed on Oct. 29, 2018, now Pat. No. 10,919,986, which is a continuation of application No. PCT/US2017/030078, filed on Apr. 28, 2017.

(60) Provisional application No. 62/424,096, filed on Nov. 18, 2016, provisional application No. 62/329,778, filed on Apr. 29, 2016.

(51) Int. Cl.
| | |
|---|---|
| *C08B 15/10* | (2006.01) |
| *B01D 61/38* | (2006.01) |
| *B01D 67/00* | (2006.01) |
| *B01D 69/02* | (2006.01) |
| *B01D 69/12* | (2006.01) |
| *B01D 71/10* | (2006.01) |
| *B01J 20/26* | (2006.01) |
| *B01J 20/28* | (2006.01) |
| *B82Y 30/00* | (2011.01) |
| *B82Y 40/00* | (2011.01) |
| *C08J 5/22* | (2006.01) |
| *C08K 5/092* | (2006.01) |
| *C08L 1/02* | (2006.01) |
| *D06M 13/192* | (2006.01) |
| *D06M 13/21* | (2006.01) |
| *D06M 13/33* | (2006.01) |
| *D06M 101/06* | (2006.01) |
| *D06M 101/28* | (2006.01) |

(52) U.S. Cl.
CPC ............. *C08B 15/10* (2013.01); *B01D 61/38* (2013.01); *B01D 67/00931* (2022.08); *B01D 69/02* (2013.01); *B01D 69/125* (2013.01); *B01D 71/10* (2013.01); *B01J 20/267* (2013.01); *B01J 20/28007* (2013.01); *B01J 20/28038* (2013.01); *B01J 20/2808* (2013.01); *C08J 5/2275* (2013.01); *C08K 5/092* (2013.01); *C08L 1/02* (2013.01); *D06M 13/192* (2013.01); *B01D 2323/08* (2013.01); *B01D 2323/30* (2013.01); *B01D 2323/36* (2013.01); *B01D 2325/06* (2013.01); *B01D 2325/14* (2013.01); *B01D 2325/16* (2013.01); *B01J 2220/52* (2013.01); *B82Y 30/00* (2013.01); *B82Y 40/00* (2013.01); *C08J 2301/02* (2013.01); *D06M 13/21* (2013.01); *D06M 13/33* (2013.01); *D06M 2101/06* (2013.01); *D06M 2101/28* (2013.01)

(58) Field of Classification Search
CPC ........ B01D 71/10; B01D 71/12; B01D 71/14; B01D 71/16; B01D 71/18; B01D 71/20; B01D 71/22; C08K 5/092; C08L 1/02
See application file for complete search history.

(56) References Cited

U.S. PATENT DOCUMENTS

| | | |
|---|---|---|
| 3,526,048 A | 9/1970 | Rowland et al. |
| 4,936,865 A | 6/1990 | Welch et al. |
| 5,183,707 A | 2/1993 | Herron et al. |
| 5,205,836 A | 4/1993 | Hansen et al. |
| 6,420,024 B1 | 7/2002 | Perez et al. |

(Continued)

FOREIGN PATENT DOCUMENTS

| | | |
|---|---|---|
| CA | 2917792 C | 1/2015 |
| EP | 0688897 B1 | 12/1995 |

(Continued)

OTHER PUBLICATIONS

Nanopariel, LLC, PCT/US2017/030078 filed Apr. 28, 2017, "The International Search Report and the Written Opinion of the International Searching Authority, or the the Declaration", mailed Jul. 18, 2017.

(Continued)

*Primary Examiner* — Layla D Berry
(74) *Attorney, Agent, or Firm* — McKee, Voorhees & Sease, PLC

(57) ABSTRACT

The invention relates to porous polymeric cellulose prepared via cellulose crosslinking. The porous polymeric cellulose can be incorporated into membranes and/or hydrogels. In preferred embodiments, the membranes and/or hydrogels can provide high dynamic binding capacity at high flow rates. Membranes and/or hydrogels comprising the porous polymeric cellulose are particularly suitable for filtration, separation, and/or functionalization media.

27 Claims, 5 Drawing Sheets

(56) References Cited

U.S. PATENT DOCUMENTS

| | | |
|---|---|---|
| 6,610,884 B2 | 8/2003 | Gerle et al. |
| 7,261,817 B2 | 8/2007 | Requate et al. |
| 8,003,364 B2 | 8/2011 | Post Hansen et al. |
| 8,021,889 B2 | 9/2011 | Boschetti et al. |
| 8,163,531 B2 | 4/2012 | Post Hansen et al. |
| 8,403,151 B2 | 3/2013 | Cheng et al. |
| 8,470,578 B2 | 6/2013 | Post Hansen et al. |
| 8,496,123 B2 * | 7/2013 | Axen ............... B01J 20/3219 210/500.1 |
| 8,945,389 B2 | 2/2015 | Faber et al. |
| 9,074,077 B2 | 7/2015 | Harada et al. |
| 9,109,201 B2 | 8/2015 | Post Hansen et al. |
| 9,309,385 B2 | 4/2016 | Umemoto et al. |
| 9,387,443 B2 | 7/2016 | Faber |
| 9,433,904 B2 | 9/2016 | Demmer et al. |
| 9,623,352 B2 | 4/2017 | Kas et al. |
| 10,252,199 B2 | 4/2019 | Kas et al. |
| 10,315,133 B2 | 6/2019 | Faber et al. |
| 10,415,031 B2 | 9/2019 | Sinha |
| 10,517,973 B2 | 12/2019 | Leuthold et al. |
| 2004/0206694 A1 | 10/2004 | Charkoudian |
| 2004/0241436 A1 | 12/2004 | Hsieh et al. |
| 2008/0245736 A1 | 10/2008 | Charkoudian et al. |
| 2010/0143435 A1 | 6/2010 | Dagger et al. |
| 2010/0270234 A1 | 10/2010 | Liu et al. |
| 2011/0120947 A1 | 5/2011 | Faber |
| 2011/0198282 A1 | 8/2011 | Chu et al. |
| 2013/0142763 A1 | 6/2013 | Carlson et al. |
| 2013/0260419 A1 | 10/2013 | Ransohoff et al. |
| 2014/0295162 A1 * | 10/2014 | Suzuki ............... B01J 20/24 428/219 |
| 2015/0114907 A1 * | 4/2015 | Gong ............... B01J 20/28023 210/660 |
| 2015/0298065 A1 | 10/2015 | Chu et al. |
| 2015/0375177 A1 | 12/2015 | Xiao et al. |
| 2017/0016864 A1 | 1/2017 | Gjoka et al. |
| 2017/0106334 A1 | 4/2017 | Chu et al. |
| 2018/0159139 A1 | 6/2018 | Radacsi et al. |
| 2018/0243724 A1 | 8/2018 | Villain et al. |
| 2019/0054397 A1 | 2/2019 | Pflanz et al. |
| 2019/0105632 A1 | 4/2019 | Kupracz et al. |
| 2019/0209732 A1 | 7/2019 | Xie et al. |
| 2019/0314746 A1 | 10/2019 | Leung |
| 2019/0343772 A1 | 11/2019 | Barbe et al. |
| 2019/0358609 A1 | 11/2019 | Ley et al. |
| 2019/0376210 A1 | 12/2019 | Drakonakis et al. |
| 2019/0381457 A1 | 12/2019 | Erdenberger |
| 2020/0171418 A1 | 6/2020 | Rezaei et al. |
| 2020/0173076 A1 | 6/2020 | Cataldo et al. |
| 2020/0179848 A1 | 6/2020 | Higginson et al. |

FOREIGN PATENT DOCUMENTS

| | | | |
|---|---|---|---|
| JP | 2008234898 A | | 10/2008 |
| JP | 2008266828 A | | 11/2008 |
| JP | 2009275310 A | | 11/2009 |
| JP | 2012046843 A | | 3/2012 |
| KR | 1020160016416 A | | 2/2016 |
| WO | 9423121 A1 | | 10/1994 |
| WO | 9532793 A1 | | 12/1995 |
| WO | 2007017085 A2 | | 2/2007 |
| WO | 2012127119 A1 | | 9/2012 |
| WO | 2013009253 A1 | | 1/2013 |
| WO | 2015055269 A1 | | 4/2015 |
| WO | 2019237149 A1 | | 12/2019 |

OTHER PUBLICATIONS

Nanopareil, LLC, PCT/US2017/030078 filed Apr. 28, 2017, "Extended European Search Report", 11 pages, mailed Nov. 7, 2019.

* cited by examiner

POROUS POLYMERIC CELLULOSE PREPARED VIA CELLULOSE CROSSLINKING

CROSS REFERENCE TO RELATED APPLICATIONS

This application is a continuation application of U.S. Ser. No. 17/248,915, filed Feb. 12, 2021, which application is a continuation application of U.S. Ser. No. 16/173,563, filed Oct. 29, 2018, now U.S. Pat. No. 10,919,986 issued Feb. 16, 2021, which application is a continuation of PCT/US17/30078, filed on Apr. 28, 2017. These applications are related to and claim priority to U.S. provisional patent application Ser. No. 62/424,096 filed on Nov. 18, 2016, and U.S. provisional patent application Ser. No. 62/329,778, filed on Apr. 29, 2016, all of which are incorporated herein in their entirety, including, without limitation, the specification, claims, and abstract, as well as any figures, tables, or drawings thereof.

GRANT REFERENCE

This invention was made with government support under Grant No. IIP-1329377, awarded by the National Science Foundation. The Government has certain rights in this invention.

FIELD OF THE INVENTION

The invention relates to porous polymeric cellulose prepared via cellulose crosslinking. The porous polymeric cellulose can be incorporated into membranes and/or hydrogels.

BACKGROUND OF THE INVENTION

Cellulose based membranes offer several advantages over other materials in filtration applications. Cellulose is a readily available, renewable polymer that is non-toxic and readily modified to add functionality for advanced separations. Cellulose is currently used in a variety of membrane products including air, water, and oil purification and adsorptive filtration applications.

However, there are several challenges that must be overcome to realize the advantages of cellulose as a filtration media. Cellulose readily absorbs water, swelling when wet. Water absorbance/swelling constricts membrane pore spaces and leads to reduced permeability. In addition, the volume of the entire membrane increases. If the base material is modified with functional groups to act as a chromatography media, further swelling may occur as water interacts with the functional groups added to capture proteins and other molecules of interest. Because total volume of the material is increased, volumetric binding capacity (amount of target molecule bound per volume of material) decreases compared to a non-swelling material. In extreme cases of functional group addition (e.g. addition of functional tendrils via ATRP), a hydrogel is formed with very high binding capacity on a mass basis, but suffering from very low permeability and low volumetric binding capacity due to material swelling and pore constriction.

When wet, cellulose is also a very mechanically flexible material. After functionalization, the material becomes even less structured and does not retain its shape. This flexibility makes physically working with the material difficult. For example, in packing material into a housing in preparation for flow through filtration, transferring the material must be done with great care or the material folds upon itself and must be separated at risk of damaging the material. The flexible nature of cellulose also means that material compression may occur during flow through filtration. Because of welling, increased pressures must be applied to obtain a given flowrate compared to non-swelling materials. Over time, pressure may compact the cellulose, reducing pore spaces and increasing pressure further. The reduced pore spaces also decrease adsorption kinetics as target molecules can no longer easily access certain binding sites through convection and must rely on slower diffusion to reach these sites and adsorb to the material. The result is increasing pressure requirements over multiple runs and very low maximum flowrates 2 MV/min) and/or very deep membrane beds (>1 cm) to achieve high binding capacity.

Therefore, reducing the swelling of cellulose is advantageous in increasing permeability and volumetric binding capacity. In addition, if material stiffness could be increased, the resulting membrane would be easier to physically work with and would not compress under flow, maintaining low pressure drop over multiple runs and high binding capacity at high flowrates and/or smaller bed depths. Thus, an object of the invention is to provide porous cellulose compositions with improved physical and kinetic properties as a result of reduced swelling. A further object of the invention is to provide porous cellulose compositions with increased material stiffness, kinetics, and durability. Other objects and advantages of the invention are apparent from the detailed description, figures, and claims.

The invention described herein uses crosslinking using multi-functional carboxylic acids to modify cellulose containing membrane materials to reduce swelling, increase stiffness and durability (reuseability). In a preferred embodiment, the compositions can provide high binding capacity at high flowrates after the material is further modified for use as a chromatography medium.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF SUMMARY OF THE INVENTION

An advantage of the invention is that the porous cellulosic materials provide increased binding capacity to that of existing cellulosic materials. It is an advantage of the present invention that membranes and/or hydrogels prepared with the porous polymeric cellulosic compositions are particularly suitable for filtration, separation, and/or functionalization media. In an aspect of the invention membranes and/or hydrogels of the invention can provide increased binding capacity and operate at higher flow rates.

In a preferred embodiment, the present invention is directed to compositions comprising a membrane, hydrogel, or combination thereof, which are comprise cellulose, wherein the cellulose is crosslinked, and wherein the composition comprises pores and/or channels. In an aspect of the invention, the preferred embodiment can be a hybrid or non-hybrid membrane.

Yet another preferred embodiment of the invention is directed to methods of preparing a composition comprising adding a composition comprising cellulose to a crosslinking system; wherein the crosslinking system comprises a crosslinking agent and a catalyst; and curing the composition thereafter; wherein the composition comprises pores and/or channels.

While multiple embodiments are disclosed, still other embodiments of the present invention will become apparent to those skilled in the art from the following detailed description, which shows and describes illustrative embodiments of the invention. Accordingly, the figures and detailed description are to be regarded as illustrative in nature and not restrictive.

Figure 1:
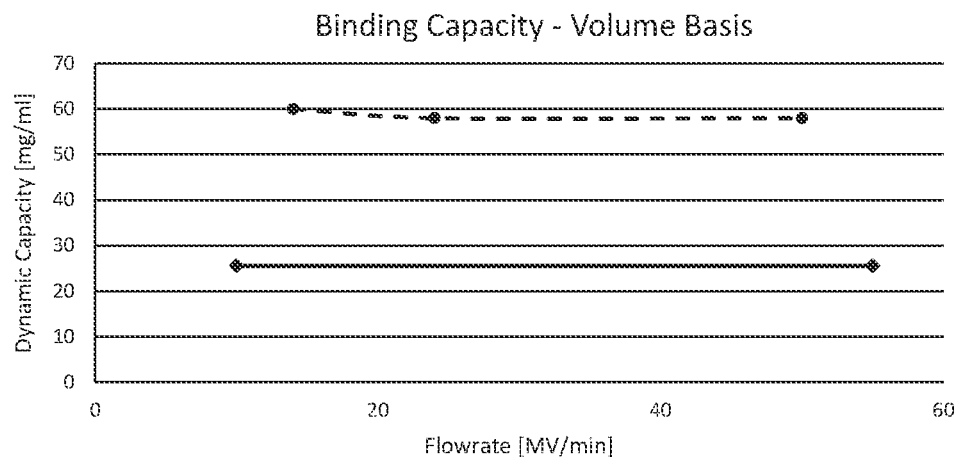
FIG. 1 is a graph comparing the binding capacity on a volume basis of an exemplary Generation 1 cellulosic membrane of the invention (represented by the dashed line) and a traditional commercially available membrane (represented by the solid line).

Various embodiments of the present invention will be described in detail with reference to the figures. Reference to various embodiments does not limit the scope of the invention. Figures represented herein are not limitations to the various embodiments according to the invention and are presented for exemplary illustration of the invention.

DETAILED DESCRIPTION OF A PREFERRED EMBODIMENT

The present invention relates to porous cellulosic materials. The porous cellulosic materials can be incorporated into membranes that have many advantages over existing membranes. For example, membranes comprising the porous cellulosic material can have higher binding capacity and can operate at higher flow rates than existing membranes.

The embodiments of this invention are not limited to particular cellulosic materials, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges and fractions as well as individual numerical values within that range (e.g. 1 to 5 includes 1, 1.5, 2, 2%, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "mass capacity" as used herein refers to the amount of product bound per mass of adsorbent. Capacity for protein adsorption is considered "high" if it is above 200 mg of protein/g adsorbent.

The term "volume capacity" as used herein refers to the amount of product bound per dry volume of adsorbent. Capacity for protein adsorption is considered "high" if it is above 100 mg protein/ml of adsorbent.

The term "flowrate" as used herein refers to the volume of liquid expressed in dry membrane volumes (MVs) flowed through membrane per time expressed in minutes. Flowrate is considered high if it is above 20 MV/min.

The term "composite nanofibers" as used herein are nanofibers produced from at least two different polymers.

The term "differentially removable" as used herein means that, when the hybrid nanofiber felt contains at least two different nanofibers prepared with different polymers, conditions can be selected (elevated temperature and/or solvent exposure) to remove one of the nanofibers or polymers forming part of a nanofiber (e.g., in a composite nanofiber).

The term "electrospinning" as used herein refers to the application of electric forces to the spin dope to form nanofibers.

The terms "membrane", "felt", "mat", and "screen", as used herein are interchangeable and refer to a non-woven, randomly overlaid collection of fibers, woven collections of fibers, or oriented fibers.

The term "nano fiber felt" as used herein refers to a collection of nanofibers in a substantially planar array, which may also include microfibers added for strength, enhancing flux, etc.

The term "microfibers" as used herein refers to fibers with diameters larger than 1.0 micrometer, and generally between 1.0 micrometer and 1.0 millimeter.

The term "nanofibers" as used herein refers to fibers with diameters smaller than of 1.0 micrometer, and generally between 10 nanometers and 1.0 micrometer, such as between 200 nm and 600 nm.

The term "single component nanofibers" as used herein are nanofibers produced from at least two different polymers.

The term "spin dope" as used herein refers to the polymer solution that is used in the electrospinning process.

Crosslinked Cellulose Compositions and Methods of Preparing and Using the Same

The compositions of the invention include porous membranes and hydrogels comprising cellulose. In some embodiments, these compositions can be formed into desired shapes, including, but not limited to fibers, wafers, cylinders, spheres, and hollow tubes. These cellulosic compositions can be prepared or obtained in prepared form. The cellulosic composition can be in the form of a hydrogel, membrane, nanofibrous mat, and combinations thereof, and can include nanofibers, microfibers, and mixtures thereof. Preferably the cellulosic compositions can be porous and/or channeled. The pores and channels can be nanopores, micropores, nanochannels, microchannels, and combinations thereof. In certain embodiments, the cellulosic membranes can be functionalized or have tendrils (preferably Aton Transfer Radical Polymerization (ATRP) tendrils) or hydrogels attached to their surface.

The cellulosic composition can be a hybrid composition containing cellulose and a non-cellulose-based polymer. Suitable hybrid cellulosic compositions and methods of preparing the same are described in U.S. Patent Publication No. 2015/0360158, which is incorporated herein in its entirety. In another embodiment, the cellulosic composition can consist of or consist essentially of cellulose. Such cellulosic compositions, while consisting of or consisting essentially of cellulose in the polymer structure, can still be surface functionalized and have attached tendrils or hydrogels.

For example, hybrid cellulosic compositions can be prepared by electrospinning a hybrid felt with a first non-cellulose-based nanofiber and a composite nanofiber. The first non-cellulose-based nanofiber can be prepared by electrospinning a first non-cellulose-based polymer; preferably, the first non-cellulose-based nanofiber is a single component nanofiber. The composite nanofiber can be prepared by electrospinning a cellulose-based polymer and a second non-cellulose-based polymer. In an aspect of the invention, the first and second non-cellulose-based polymers can be differentially removable.

The hybrid cellulosic compositions can contain at least 30 wt. %, at least 40 wt. %, at least 50 wt. %, at least 60 wt. %, or at least 70 wt. % cellulosic nanofibers.

Non-Cellulose-Based Polymers

While the majority by mass in a hybrid cellulosic composition can be from the cellulose-based polymers, incorporation of additional types of fibers within the felts can provide functionality desired for applications of the felts. Accordingly, it is desirable to have additional fibers within the felts because they can provide increased mechanical strength to the felt, allow for multiple functionalities to be incorporated into the felt, provide stability to the manufacturing process, and other aspects as explained elsewhere herein. Indeed, it was unexpectedly discovered by the present inventors that including even a small proportion of non-cellulosic-based polymers in the hybrid cellulosic compositions improved the electrospinning process and also allowed for tailoring of the finished product for a variety of biological and industrial applications, especially when the hybrid cellulosic compositions contained both a composite nanofiber and a single component nanofiber.

Synthetic polymer nanofibers (e.g., those produced from vinyl polymers and acrylic polymers) offer a wide range of chemical functionalities for bioseparations and other applications. By combining different polymeric units, the surface chemistry of the resulting fiber can be controlled as part of the electrospinning process, providing direct functionality to the produced nanofiber. As an alternative, and similar to conventional micrometer scale fibers, the surface functionality of polymer nanofibers can be chemically modified post-electrospinning to accommodate specific functionality requirements for various bioseparation applications. Functionalization chemistries are well known in the polymer arts. They also generally withstand harsh cleaning regimens associated with bioprocesses. Exemplary functionalization chemistries are also discussed in more detail elsewhere herein.

Synthetic carbon-based adsorptive media and filtration membranes are often much more chemically robust than cellulose-based media, and thus can be used when strong acids and bases are required for cleaning the separation media between uses. Furthermore, hybrid nanofibers that include both cellulose-based and non-cellulose-based polymers (e.g., polyacrylonitrile and polyvinyl alcohol) exhibit even higher specific surface area and greater mechanical strength when compared to single component cellulose or single component synthetic polymer nanofibers. Accordingly, there is an observable synergy when composite nanofibers include both cellulose and non-cellulose-based polymers.

Many polymers have been successfully electrospun into nanofibers, including (1) thermoplastic homopolymers such as vinyl polymers, acrylic polymers, polyamides, polyesters, polyethers, and polycarbonates, (2) thermoplastic copolymers such as vinyl-co-vinyl polymers, acrylic-co-acrylic copolymers and vinyl-coacrylic polymers, (3) elastomeric polymers such as triblock copolymer elastomers, polyurethane elastomers, and ethylene-propylene-diene-elastomers, (4) high performance polymers such as polyimides and aromatic polyamides, (5) liquid crystalline polymers such as poly(p-phenylene terephthalamide) and polyaramid, (6) textile polymers such as polyethylene terephthalate and polyacrylonitrile, (7) electrically conductive polymers such as polyaniline, as well as (8) biocompatible polymers (i.e. "biopolymers") like polycaprolactone, polylactide, chitosan and polyglycolide. As described, the polymer may also be a copolymer of two or more of the above-named polymer species.

Examples of the additional polymers that can be added into the hybrid nanofiber felts are electrospun as single component nanofibers from polyacrylonitrile (PAN), polyimides, polyamides (nylon 6, nylon 6,6, nylon 6,10, etc.), polyesters (polyethylene terephthalate, etc.), as well as copolymers thereof.

Preparation of Cellulosic Compositions

Preferably, production of cellulosic compositions relies on the cellulose acetate form of the molecule due to high solubility in commonly used solvents. After production, cellulose can be obtained by regenerating the material with sodium hydroxide in a solvent containing water and ethanol. Specifically, a concentration in the range of about 0.05 to about 0.5 N NaOH in a regeneration solvent consisting of about 0 to about 20 (vol %) ethanol in water is preferred with a regeneration time of up to about 48 hours. The material can be washed with several volumes of water, preferably reverse osmosis (RO) water, and dried at room temperature. Other methods of preparing cellulosic felts can also be employed.

Once a cellulosic composition is obtained, the material can be added to a crosslinking system. The crosslinking system can comprise a crosslinking agent and a catalyst in solution. Preferably the crosslinking agent and catalyst are in a solution with water. Preferably, the water is RO water.

Suitable concentration ranges of the crosslinking agent can be from about 5 to about 100 g/L and catalyst from about 5 to about 100 g/L. Preferred crosslinking agents can include, but are not limited to, aldehydes, organochlorides, ethers, multi-functional carboxylic acids, urea derivatives, glycidyl ethers, and mixtures thereof.

The catalyst used can depend on the crosslinking agent. Preferred catalysts include, but are not limited to, cyanamide, boric acid, aluminum sulfate, ammonium persulfate, sodium hypophosphite, magnesium chloride, phosphate-containing compounds, and mixtures thereof.

Preferred crosslinking agents include, but are not limited to, compounds containing a multi-functional carboxylic acid and/or catalysts described above. Preferred crosslinking agents include, but are not limited to, citric acid, malic acid, maleic acid, itaconic acid-maleic acid, 1,2,3,4 buthanetetracarboxylic acid (BTCA), sodium hypophosphite, ammonium persulfate, sodium hydroxide, aluminum sulfate, glyoxal, glycerol, 1,4 butanediol diglycidyl ether, and mixtures thereof. In some embodiments 1,2,3,4 buthanetetracarboxylic acid (BTCA), ammonium persulfate, glycerol, glyoxal, sodium hypophosphite, and combinations thereof are most preferred crosslinking agents.

The cellulosic composition can be soaked from about 2 minutes to about 1 hour in the crosslinking system and removed. In some embodiments, the crosslinking system can be heated and/or stirred while the cellulosic composition is soaking. A portion of the crosslinking solution may be removed from the cellulosic felt via pressing to obtain a certain amount of crosslinking agent per mole of cellulose andydroglucose units (AGUs). The wet cellulose containing material can then dried. Preferably the drying is performed at a temperature between about 20° C. and about 100° C. for a time greater than 0 minutes and less than about 120 minutes; most preferably the drying is performed at about 25° C. for between about 30 and about 60 minutes. The drying and curing steps can be performed separately or simultaneously. In a preferred embodiment, they are performed separately.

The cellulosic composition is also cured. Preferably, the cellulose containing material is cured at a temperature between about 120° C. and about 195° C. for between about 1 and about 30 minutes. The cellulose containing material can be cooled after being at a temperature elevated above room temperature. After cooling to room temperature, the material can be washed and then dried at room temperature. Preferably the composition is washed in water, more preferably in RO water.

In an aspect of the invention cellulosic composition can be layered. The layered compositions can have any number of layers, including for example, between about 2 layers and about 1000 layers.

The cellulosic compositions that have been crosslinked can exhibit significantly improved properties compared to the base material. For example, the compositions can have increased stiffness, reduced shedding, improved permeability when wet, durability, reuseability and/or reduced swelling. The crosslinked cellulosic compositions can be stiffer, hold its shape better, and can be readily packed into filtration holders. Permeability is not adversely affected by the crosslinking and with certain crosslinking conditions may be improved. After crosslinking, the compositions can be used directly in filtration applications or further modified. The material can further modified to add functional groups to create other chromatography media (e.g., cation/anion exchange, affinity, etc.). An additional benefit is that the modified cellulose material can contain some unreacted carboxyl groups after the crosslinking. Beneficially, these unreacted carboxyl groups can act as cation exchange groups by themselves without additional modification.

Surprisingly, it was found that the improved permeability present in the crosslinked cellulose compositions was retained even after further modification. This allows for much higher flowrates to be used with little loss in binding capacity. Even more surprising was that operating flowrates in excess of 100 MV/min could be used without significant loss of binding capacity, where the non-stabilized functionalized material was limited to <5 MV/min. This may indicate that the improvements in material stiffness translated to a more structured material in which good flow distribution and minimal compression allowing for high permeability and very fast adsorption kinetics.

The crosslinked cellulose compositions can be formed into desired shapes. In some embodiments, the crosslinked cellulose compositions can be used as a filtration, separation, and/or functionalization media. In a preferred embodiment the filtration media is for adsorption and chromatography, including, but not limited to liquid chromatography, HPLC, UPLC, and/or gas chromatography. The cellulosic compositions can be used to separate many materials, including, but not limited to, biomaterials, microorganisms, proteins, DNA, etc. Preferably, the cellulosic compositions can be used to separate microorganisms, including, but not limited to, viruses, bacteria, yeast and mammalian cells.

Surface Functionalization

After the preparation of a hybrid composition, the fiber surfaces may be functionalized. Non-limiting examples of functionalization include the addition of ion-exchange groups such as weak or strong acids, and bases (e.g., carboxylic acids and amines), hydrophobic groups such as phenolic compounds, and affinity ligands such as virus conjugates, antibodies, enzyme substrates, and small molecule biomimetics.

For use in bioseparation, the hybrid compositions of the present invention are ideally biologically inert, meaning that they should resist non-specific binding of insoluble solids such as cells and cellular debris, as well as unwanted interactions with proteins, sugars, nucleic acids, viruses, and other soluble components present in many biologically produced systems.

In addition, nanofiber felts for use in bioseparation should exhibit several qualities: (1) small diameter fibers to allow for the largest amount of specific area (this criterion is most important for adsorption processes and less important for strictly size-based separations discussed below); (2) well-controlled and narrow pore size distribution between fibers to allow for even flow distribution during adsorptive applications and for a tight size cutoff for size-based separations; (3) fibers should have excellent mechanical and chemical stability to withstand potentially high operating pressures and harsh cleaning conditions; and (4) fibers should have a well-defined and spatially consistent size and chemical composition.

For adsorption processes, where macromolecular products such as proteins, nucleic acids, and viruses are the predominant targets, the large specific surface area associated with nanofiber felts provides a plurality of potential binding sites for adsorptive bioseparations. Nanofibers can be modified to contain a plurality of binding sites and adsorption can occur on the surface of the fibers, which makes the binding sites immediately available without requiring the target molecule to diffuse internally. Internal diffusion can often limit the capacity for many adsorption processes of bioproducts when using traditional porous resin beads because of the relatively large size of the target molecules. In addition, because the nanofiber membranes can be made from many different polymer and cellulose-based nanofibers, the adsorption ligand can be tailored to meet the needs of a particular separation (e.g., ionic, hydrophobic, and affinity). In some cases the ligand can be incorporated into the nanofiber from the source materials during electrospinning, or alternatively the surface can be chemically modified to provide the desired adsorbing agent after producing the nanofiber.

Two of the most important characteristics of the separation operation are that, (1) flow is through micro- and macro-pores of the felt (as opposed to tightly packed resin beads), and (2) that adsorption takes place on the surface of the fibers, where no internal diffusion is required. These factors reduce concerns of high-pressure drops with elevated flow rates, and eliminate the slow intra-particle diffusion required for adsorption within resin beads. It has been shown that the binding capacity of biomolecules to currently available adsorptive felts is similar in magnitude to resin beads, but can operate at processing flow rates over 10 times faster than packed beds. These factors allow for much faster processing times and potentially higher binding levels for purifying valuable biological products. This is highly desirable, especially for large biomolecules (molecular weights greater than 100 kDa, and/or hydrodynamic diameters of 20-300 nm), because they are difficult to purify using packed beds due to the mass transfer limitations within the small pores of resin beads.

The surface of the nanofiber felts of the present invention can be modified to provide ion-exchange and hydrophobic interaction chemistry. Simple chemical modification such as sulfonation of polystyrene fibers with sulfuric acid can be used to produce a cation exchange medium. Grafting, atom transfer radical polymerization (ATRP), and plasma treatments can be used to create ion-exchange surface functional groups as well as three-dimensional tethers from a variety of polymeric substrates including polypropylene, polyvinylidene difluoride, polysulphone, and others. Phenyl and butyl groups can also be introduced as hydrophobic interaction ligands. It may be desirable to further modify the surface of polymer membranes to increase the hydrophilicity and to discourage non-specific binding. This has been accomplished by introduction of poly(ethylene glycol) and other polyols onto the surface.

The ion exchange capacity of a hybrid compositions can also be enhanced by introducing, including for example, but not limited to, diethylaminoethyl (DEAE) groups as a weak anion exchange ligand or carboxylic acid as a weak cation exchange ligand.

Surface Functionalization with Antimicrobials

In one embodiment of the present invention, the non-cellulose-based polymer is polyacrylonitrile (PAN). Fibrous membranes of PAN are preferable for filtration due to thermal stability, high mechanical properties, and chemical resistivity. Electrospun PAN nanofiber felts have been of particular interest due to properties such as small fiber diameters and the concomitant large specific surface areas, as well as capabilities to control pore sizes among nanofibers and to incorporate antimicrobial agents at nanoscale. Felts comprised of nanofibers with antimicrobial functionality have attracted growing attentions due to the concerns about qualities of purified water and/or filtered air as well as the processing costs. Water and air filters (particularly those operating in the dark and damp conditions) are constantly subject to attacks from environmental microorganisms. The microorganisms (such as bacteria) that can be readily captured by the filters grow rapidly, resulting in the formation of biofilms. Consequently, the buildups of microorganisms on the filter surfaces deteriorate the qualities of purified water and/or filtered air; additionally, they also have the unfavorable effects on the flow of water and/or air.

Moreover, the contaminated filters with biofilms are difficult to clean. Usually, high pressure is required during the operation. This in turn increases the costs. Reported methods incorporate antimicrobial agents (such as N-halamine and silver ions/nanoparticles) directly into spin dopes, thus the molecules/particles of antimicrobial agents are distributed throughout the nanofibers (Xinbo Sun, Lifeng Zhang, Zhengbing Cao, Ying Deng, Li Liu, Hao Fong, and Yuyu Sun. "Electrospun Composite Nanofiber Fabrics Containing Uniformly Dispersed Antimicrobial Agents as an Innovative Type of Polymeric Materials with Superior Anti-Infective Efficacy". ACS Applied Materials and Interfaces, 2(4), 952-956, 2010.)

However, this often leads to process problems, primarily because the high content of antimicrobial agents can seriously affect the process of electrospinning and/or deteriorate the properties of the resulting nanofibers. A potential solution to these problems is to introduce antimicrobial functionality onto nanofiber surfaces after the nanofibers are produced (Lifeng Zhang, Jie Luo, Todd J. Menkhaus, Hemanthram Varadaraju, Yuyu Sun, and Hao Fong. "Antimicrobial Nano-fibrous Membranes Developed from Electrospun Polyacrylonitrile Nanofibers". Journal of Membrane Science, 369, 499-505, 2011.)

It is known that the nitrile (—C≡N) groups in PAN can be chemically converted into amidoxime (—C(NH$_2$)=NOH) groups. The amidoxime groups can coordinate with a wide range of metal ions including silver ions, and the coordinated silver ions can be reduced into silver nanoparticles. Both silver ions and silver nanoparticles are antimicrobial agents with high antimicrobial efficacy.

OTHER EXAMPLES

A promising alternative to packed bed chromatography and other separation technologies is the use of the hybrid compositions of the present invention as selective adsorptive membranes. This style of adsorption utilizes the nanofiber felts as the support for ligands that are used during the selective adsorption process.

Selective adsorption involves "active" surface functionalization of the hybrid nanofiber felt, which allows for direct capture (adsorption) of target substances. Such modification is simplified if the hybrid compositions include chemical moieties on their surfaces that are relatively simple to chemically modify to provide adsorption sites.

Unlike modifying nanofiber surfaces for ion-exchange and hydrophobic interaction functionality, incorporating affinity ligands onto the nanofiber can be more challenging. Often, the process requires first modifying the surface to create coupling sites for immobilization of the ligand, followed by attachment of the ligand to the active site. Importantly, both the initial surface modification and the coupling of ligand should be robust as not to leach during processing.

In some cases, simple carboxyl groups from grafting methacrylic acid onto the surface can act as the active coupling site by creating a covalent amide bond between the functionalized carboxyl group and an exposed amine group on a protein ligand. Similarly, strong oxidation of cellulose (if controlled properly) can provide aldehyde groups on the fiber surface that can form a covalent attachment to primary amines of a protein (including Protein A and Protein G); especially through the amino acid lysine. In other cases, surface functionalization with a general affinity dye (e.g., Cibacron Blue, capable of binding some proteins) can be coupled directly to a cellulose nanofiber.

More elaborately, bio-active sites for protein ligand immobilization can be incorporated into the nanofiber backbone during nanofelt construction. One example of this is using poly ethylene glycol (PEG) with poly D,L lactide (PDLLA) as a block copolymer. The glycol can be coupled with biocytin (capable of affinity interaction with streptavidin fusion proteins) after electrospinning to create an affinity nanofiber. Similarly, a polycaprolactone (PCL) and poly(D, L-lactic-co-glycolic acid)-b-PEG-NH2 (PLGA-b-PEF-NH2) diblock copolymer can be created containing surface aminated nanofibers for coupling with proteins using a homobifunctional coupling agent. Finally, in some cases it is possible to use intrinsic active sites associated with certain nanofiber matrices. For instance, coupling Concanavalin A (an affinity tag for lectin associated with glycol-proteins and/or other glycolconjugates) to a chitosan-based nanofiber has been successful.

Other techniques for attaching specific ligands to cellulose-based compounds and/or synthetic polymers are known in the chemical arts.

Methods of Using the Composition

In an aspect of the invention, the compositions can be used by flowing a fluid through the compositions. Preferably the porous cellulosic compositions are a membrane and/or hydrogel in such a method. More preferably, the porous cellulosic compositions can be incorporated into a variety a separation, filtration, and/or functionalization media. The method can further comprise a step of separating molecules from the fluid. The method can further comprise the step of functionalizing a molecule. In an aspect of the invention, the flow rate of the fluid can be between 5 MV/min and about 400 MV/min, preferably between about 10 MV/min and about 300 MV/min. In an aspect of the invention, the compositions can have a dynamic binding capacity on a volume basis of at least about 60 mg/ml of the composition, preferably between about 80 mg/ml and about 300 mg/ml. In an aspect of the invention, the compositions can have a dynamic binding capacity on a mass basis of at least about 120 mg/g of the composition, preferably between about 150 mg/g and about 650 mg/g.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Stabilization of Cellulose Nanofibers Via Crosslinking with BTCA

Cellulose nanofiber containing materials are stabilized by crosslinking cellulose with 1,2,3,4 Buthanetetracarboxylic Acid (BTCA) and Sodium Hypophosphite in water. A 1.55 g sheet of 85% cellulose, 15% PAN was immersed in 20 ml water containing 1.26 g BTCA and 1.30 g sodium hypophosphite. After soaking for 30 mins, the sheet was removed, placed on aluminum foil, and heat treated. The sheet was first pre-dried at 85 C for 15 minutes, followed by a temperature increase to 180 C. Next, the sheet was allowed to cool to room temperature, then immersed in reverse osmosis (RO) water to separate the sheet from the foil backing. The sheet was then washed with several volumes of RO water to remove residual BTCA and sodium hypophosphite. The produced sheet exhibited visibly enhanced material stiffness and was easier to handle. Permeability is equivalent or less than non-stabilized cellulose nanofiber sheets.

Example 2

Cation Exchange Functionalization of Stabilized Cellulose Nanofibers

Cellulose nanofibers stabilized via crosslinking may be modified with cation exchange groups using a two-step surface treatment reaction with sodium hydroxide and chloroacetic acid. The crosslinked material is immersed in a reaction solution containing from 0-100% 2-propanol in water along with 1-3 g/L NaOH. After mixing at 20-55 C, chloroacetic acid is added in amounts of 1-5 g/L. The reaction is allowed to proceed for 1-7.5 hours at 35-60 C. Reaction is terminated by washing the carboxymethylated cellulose material in several volumes of RO water followed by washing with hot (50-60 C) water for 30 minutes-2 hours. The materials obtained from the reaction act as weak cation exchange chromatography media, exhibiting high binding capacity to positively charged molecules. The reacted materials retain stiffness and low swelling behavior observed in the base materials and exhibit high permeability compared to non-crosslinked cation exchange cellulose materials. The materials also exhibit high binding capacity on a volumetric basis (>220 mg/ml lysozyme), due to low swelling behavior. The materials may be operated at very high flowrates (>100 membrane volumes per minute) with little loss in capacity.

Example 3

Anion Exchange Functionalization of Stabilized Cellulose Nanofibers

Cellulose nanofibers stabilized via crosslinking may also be modified with anion exchange groups using a separate two-step surface treatment reaction with 2-(diethylamino) ethyl chloride hydrochloride (DAECH) and sodium hydroxide. The crosslinked or non-crosslinked cellulose material is immersed in a solution of 20-60 g/l NaOH in water. After mixing at 50-70 C for 30-60 minutes, a 20% solution of DEAECH in water is added to bring the final DEAECH concentration to between 40-80 g/l. The solution is then mixed at 50-70 C for an additional 2-5 hours. The reaction is terminated by removing the material from the reaction mixture and washing with several volumes of room temperature RO water, followed by a hot wash (50-60 C) in water for 30 minutes-2 hours. The produced material acts as an anion exchange chromatography material and exhibits high volumetric binding capacity to negatively charged molecules (e.g. bovine serum albumin). If produced from non-stabilized cellulose, the produced material may be stabilized by heat treatment in the presence of a crosslinking agent, preferably ammonium persulfate. The produced material is soaked in a solution of 0.1-2 g/l ammonium persulfate in water for 30-120 minutes. Next, the material is cured at 100-150 C for 10-40 minutes.

Example 4

Comparative Testing of Cellulosic Membranes

A cellulosic membrane was prepared according to the methods of the invention except that it was not crosslinked. This exemplary membrane is referred to as Generation 1 in these examples. The Generation 1 membrane was tested against commercially available cellulosic membranes (referred to herein as "Commercial Membrane"). The binding capacity on a volume basis was assessed. The results are shown in FIG. 1 with the Generation 1 membrane represented by the dashed line and the existing commercial membrane represented by the solid line. As can be seen in FIG. 1, the exemplary Generation 1 membrane had higher adsorption capacity on a volume basis compared to the commercially available cellulose membrane.

Figure 2:
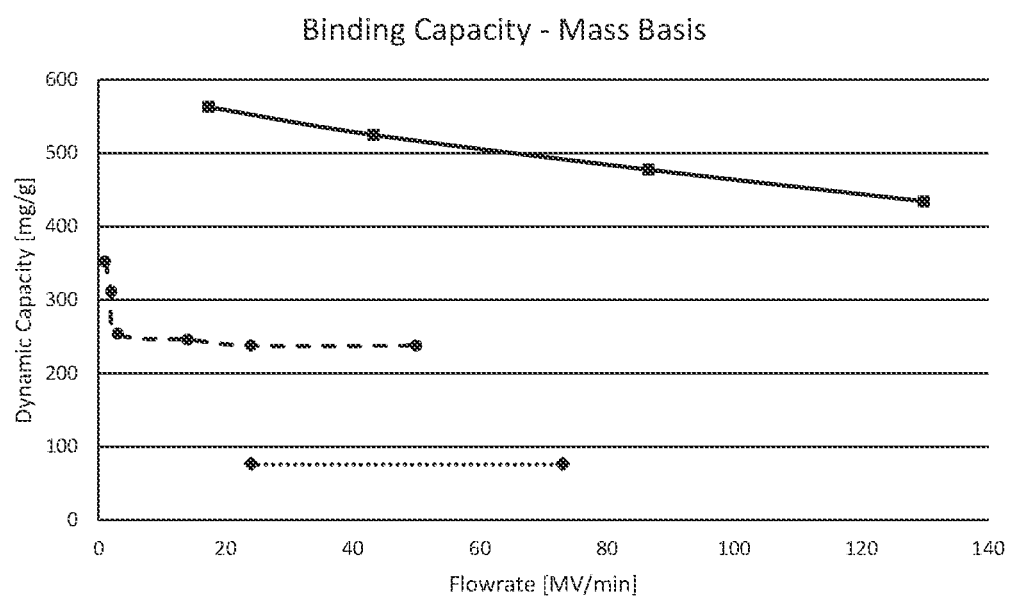
FIG. 2 is a graph comparing the binding capacity on a mass basis of two exemplary cellulosic membrane of the invention (Generation 1 and Generation 2, represented by the dashed and solid lines, respectively) and a traditional commercially available membrane (represented by the dotted line).

A crosslinked cellulosic membrane exemplary of a preferred embodiment of the invention was prepared according to the methods of the invention. It is referred to as the Generation 2 membrane. The Generation 2 membrane was tested against an existing commercially available cellulosic membrane, as well as Generation 1 membrane. The Generation 1 and Generation 2 membranes exemplary of preferred embodiments of the invention were tested for binding capacity on a mass basis in comparison with a commercially available cellulose membrane. The results are shown in FIG. 2 where the Generation 1 membrane is represented by the dashed line, the Generation 2 membrane is represented by the solid line, and the commercially available cellulose membrane is represented by the dotted line. FIG. 2 demonstrates that the exemplary membranes of the invention provide much higher dynamic capacity at much higher flow rates. The Generation 2 membrane provided the highest dynamic capacity with about 560 mg/g at 17 MV/min (3.5 second residence time) and about 480 mg/g at 87 MV/min (0.7 second residence time), whereas the commercial cellulose membrane provided less than 100 mg/g at a flow rate between 20 MV/min and 80 MV/min.

Figure 3:
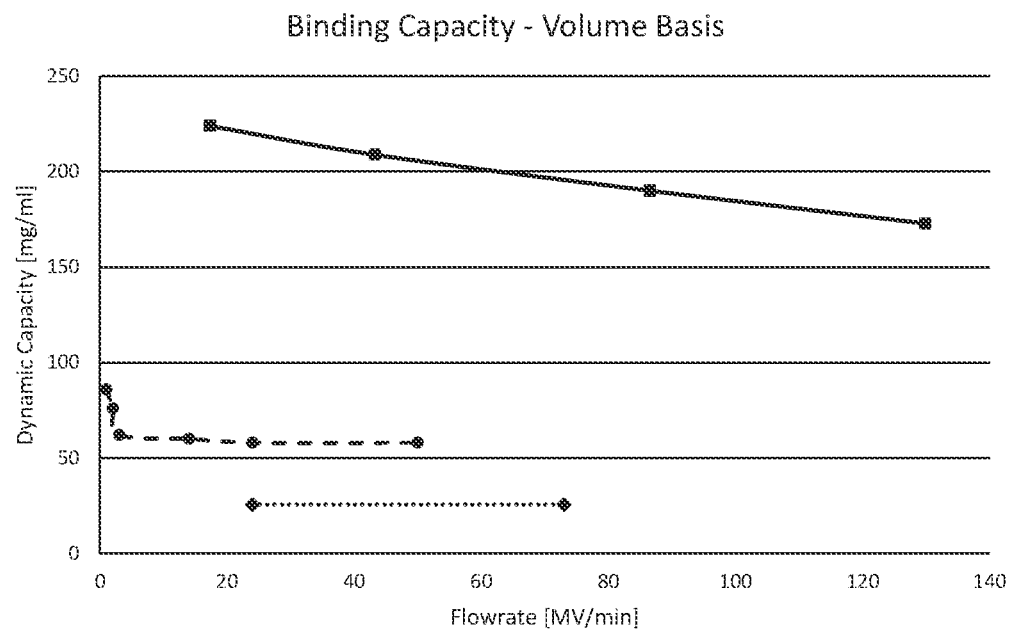
FIG. 3 is a graph comparing the binding capacity on a volume basis of two exemplary cellulosic membrane of the invention (Generation 1 and generation 2, represented by the dashed and solid lines, respectively) and a traditional commercially available membrane (represented by the dotted line).

The Generation 1 and Generation 2 membranes exemplary of preferred embodiments of the invention were also tested for binding capacity on a volume basis in comparison with a commercially available cellulose membrane. The results are shown in FIG. 3 where the Generation 1 membrane is represented by the dashed line, the Generation 2 membrane is represented by the solid line, and the commercially available cellulose membrane is represented by the dotted line. FIG. 3 shows that the exemplary membranes of the invention provide much higher dynamic capacity at much higher flow rates than the commercially available cellulose membrane. The exemplary membranes of the invention provided about 224 mg/mL at 17 MV/min (3.5 second residence time) and about 190 mg/mL at 87 MV/min (0.7 second residence time), whereas the commercial cellulose membrane provided about 30 mg/g at a flow rate between 20 MV/min and 80 MV/min.

Figure 4:
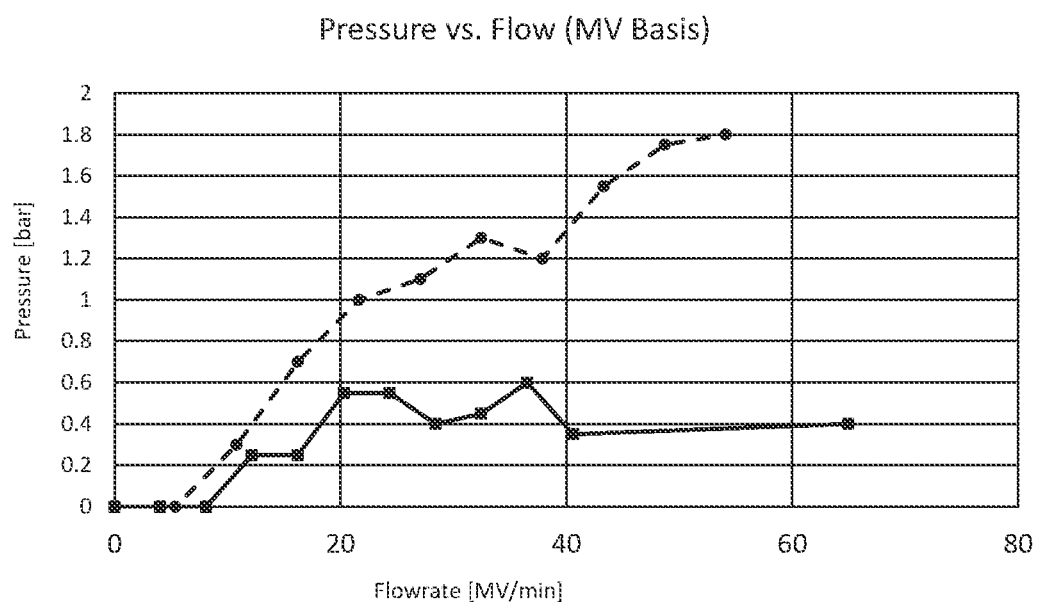
FIG. 4 is a graph comparing the pressure versus flow on a volume basis of two exemplary membranes of the invention.

The Generation 1 and Generation 2 membranes of the invention were compared for pressure versus flow. The results are provided in FIG. 4 where the generation 1 membrane is represented by the dashed line and the generation 2 membrane is represented by the solid line. The generation 1 membrane provided had a bed height of 0.6 mm and the eight-layer membrane had a bed height of 0.8 mm. As can be seen in FIG. 4 the exemplary generation 2 membrane of the invention provide high flow rates at low pressures.

As demonstrated in FIGS. 2-4, the Generation 2 membrane (which was crosslinked) outperformed the commercially available membrane and the Generation 1 membrane (not crosslinked). Without wishing to be bound by the theory it is believed that the crosslinking resulted in improved properties higher capacity and lower pressure, enabling higher flowrate operation.

Figure 5:
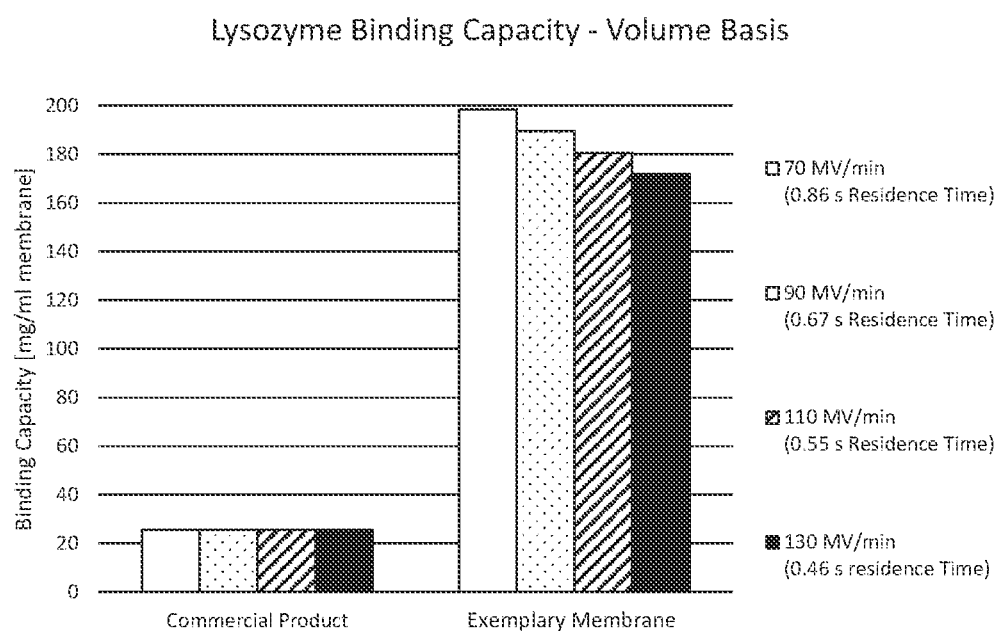
FIG. 5 is a graph comparing the binding capacity on a volume basis of an exemplary membrane of the invention and a traditional commercially available membrane at differing flow rates.

The Generation 2 exemplary membrane of the invention was tested in comparison with a commercially available cellulosic membrane for lysozyme binding capacity at varying high flow rates with residence times below 1 second. The results are shown in FIG. 5. FIG. 5 shows the binding capacity of an "Exemplary Membrane" is substantially higher than the commercial material even for very high flow rates corresponding to very short residence times. The data reflected in FIG. 5 is also provided in Table 2 below.

TABLE 2

| Flowrate [MV/min] | 70 | 90 | 110 | 130 |
|---|---|---|---|---|
| Commercial Product Capacity [mg/ml] | 25.6 | 25.6 | 25.6 | 25.6 |
| Exemplary Membrane Capacity [mg/ml] | 199 | 190 | 181 | 172 |
| Residence time [seconds] | 0.86 | 0.67 | 0.55 | 0.46 |

Example 5

Comparison of Cellulosic Exchange Membranes in Capsules

Two equal volume cellulose-based exchange membranes were tested in pre-packaged capsules. One was an exemplary eight-layer membrane of the and the other was a commercially available cellulosic membrane. A standard protein absorption-elution sequence was performed by the steps of: equilibration, loading, washing, eluting, and regeneration. Results from the data are provided in FIGS. 7-9 where the exemplary membrane of the invention is represented by the solid bars and the commercially available membrane is represented by the dotted bars.

Figure 6:
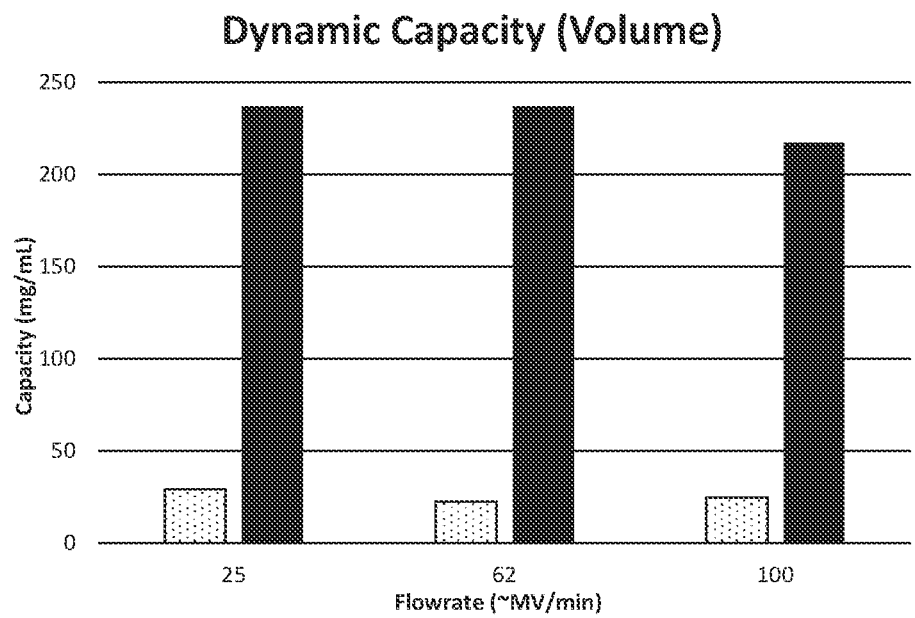
FIG. 6 is a graph comparing the dynamic capacity on a volume basis of an exemplary membrane of the invention (represented by the solid bars) and a traditional commercially available membrane (represented by the dotted bars) at differing flow rates.

FIG. 6 shows the dynamic volume capacity (at different flow rates of the two cellulose-based cation exchange membranes. It is clear from FIG. 6 that the exemplary membrane of the invention significantly outperformed the commercially available cellulose-based exchanged membrane at all flow rates.

Figure 7:
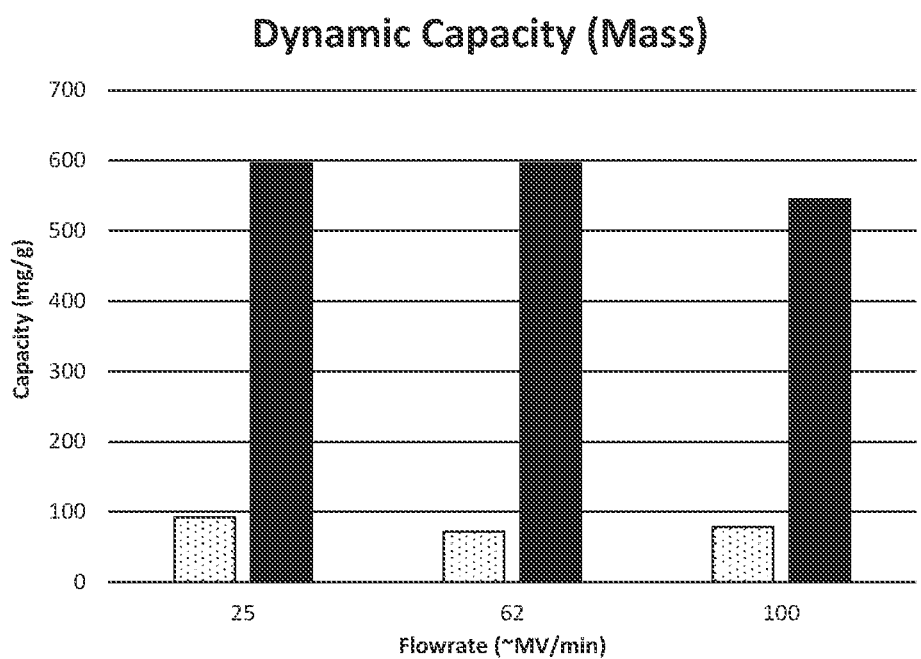
FIG. 7 is a graph comparing the dynamic capacity on a mass basis of an exemplary membrane of the invention (represented by the solid bars) and a traditional commercially available membrane (represented by the dotted bars) at differing flow rates.

FIG. 7 shows the dynamic capacity (dry mass) at different flow rates of the two cellulose-based cation exchange membranes. Again, it is clear in FIG. 7 that the exemplary membrane of the invention significantly outperformed the commercially available cellulose-based exchanged membrane at all flow rates.

Figure 8:
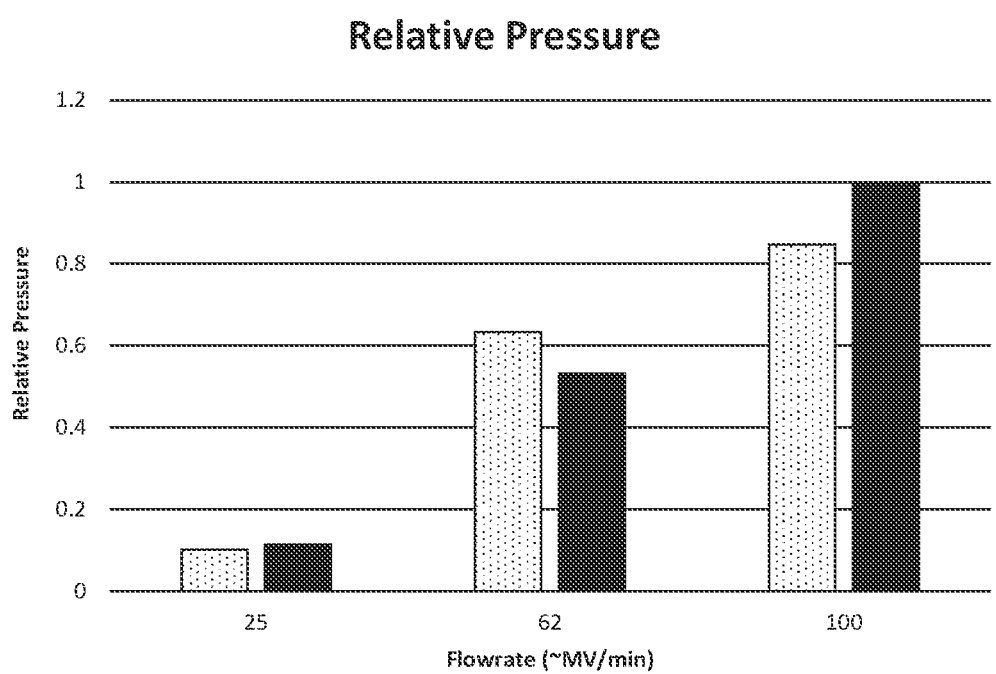
FIG. 8 is a graph comparing the relative pressure of an exemplary membrane of the invention (represented by the solid bars) and a traditional commercially available membrane (represented by the dotted bars) at differing flow rates.

FIG. 8 shows the relative pressure compared at different flow rates of the two cellulose-based cation exchange membranes. Again, the exemplary membrane of the invention outperformed the commercially available membrane.

The invention being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A separation media for biological separations comprising:
   a fiber membrane comprising regenerated cellulose fibers wherein the regenerated cellulose is crosslinked by a multi-functional carboxylic acid; wherein the fiber membrane comprises a plurality of pores and/or channels;
   wherein the regenerated cellulose fibers comprise a surface functionalization comprising a cation exchange group, an anion exchange group, or a ligand; and
   wherein the fiber membrane comprises at least 30 wt. % of the cellulose.

2. The separation media of claim 1, wherein the fiber membrane comprises at least 40 wt. % of the cellulose.

3. The separation media of claim 1, wherein the fiber membrane is a woven mat or a non-woven mat.

4. The separation media of claim 1, wherein the pores and channels comprise micropores, nanopores, microchannels, nanochannels, or a mixture thereof.

5. The separation media of claim 1, wherein the surface functionalization is an attached tendril.

6. The separation media of claim 1, wherein the anion exchange group comprises a diethylaminoethyl (DEAE) group.

7. The separation media of claim 1, wherein the cation exchange group comprises a carboxylic acid.

8. The separation media of claim 1, wherein the ligand is a protein or binds a protein.

9. The separation media of claim 1, wherein the fiber membrane is in the shape of a wafer, a cylinder, a sphere, a sheet, or a tube.

10. The separation media of claim 1, wherein the fiber membrane is a hybrid cellulosic composition.

11. A separation method comprising:
    flowing a fluid through the separation media of claim 1 to capture a biological product.

12. The method of claim 11, wherein the separation media performs a selective adsorption to separate molecules from the fluid.

13. The method of claim 11, further comprising recovering molecules from the separation media.

14. The method of claim 11, wherein the flowing is occurring at a rate of between about 5 MV/min and about 400 MV/min.

15. The method of claim 11, wherein the flowing is occurring at a rate of between about 10 MV/min and about 300 MV/min.

16. The method of claim 11, wherein the separation media has a dynamic binding capacity on a volume basis of at least about 60 mg/m of the separation media.

17. The method of claim 11, wherein the separation media has a dynamic binding capacity on a mass basis of at least about 120 mg/g of the separation media.

18. The method of claim 11, wherein the fiber membrane comprises at least 40 wt. % of the cellulose.

19. A method of preparing the separation media of claim 1 comprising:
    adding a fiber membrane comprising cellulose fibers to a crosslinking system comprising a multi-functional carboxylic acid as a crosslinking agent;
    crosslinking the cellulose to form the crosslinked cellulose.

20. The method of claim 19, wherein the crosslinking system comprises the crosslinking agent and a catalyst.

21. The method of claim 20, wherein the catalyst comprises cyanamide, boric acid, aluminum sulfate, ammonium persulfate, sodium hypophosphite, magnesium chloride, a phosphate-containing compound, or a mixture thereof.

22. The method of claim 20, wherein the crosslinking agent is in an amount of from about 10 to about 100 g/L of the crosslinking system, and wherein the catalyst is in an amount from about 10 to about 100 g/L of the crosslinking system.

23. The method of claim 19, further comprising curing the crosslinked cellulose fibers; wherein the curing step is performed for a time between about 1 minute and about 10 minutes and at a temperature of between about 120° C. and about 195° C.

24. The method of claim 19, further comprising a drying step, wherein the membrane is dried at a temperature of between about 60° C. and about 100° C.

25. The separation method of claim 13, wherein the molecules comprise proteins.

26. The separation method of claim 12, wherein the selective adsorption is performed with Protein A and/or Protein G.

27. The separation method of claim 11, wherein the biological product comprises a microorganism, a protein, a nucleic acid, a biomolecule, or a combination thereof.

* * * * *